(12) United States Patent
Keller

(10) Patent No.: US 10,440,971 B2
(45) Date of Patent: Oct. 15, 2019

(54) SYSTEM FOR DRYING ACID WHEY

(71) Applicant: Keller Technologies, Inc., Marshfield, WI (US)

(72) Inventor: A. Kent Keller, Mantorville, MN (US)

(73) Assignee: Keller Technologies, Inc., Marshfield, WI (US)

( * ) Notice: Subject to any disclaimer, the term of this patent is extended or adjusted under 35 U.S.C. 154(b) by 192 days.

(21) Appl. No.: 13/974,718

(22) Filed: Aug. 23, 2013

(65) Prior Publication Data

US 2015/0056358 A1   Feb. 26, 2015

(51) Int. Cl.

| | |
|---|---|
| *A23C 1/00* | (2006.01) |
| *A23C 1/12* | (2006.01) |
| *A23C 1/16* | (2006.01) |
| *A23C 21/00* | (2006.01) |
| *A23C 21/06* | (2006.01) |
| *C13B 30/00* | (2011.01) |
| *C13K 1/10* | (2006.01) |

(52) U.S. Cl.
CPC ................. *A23C 1/12* (2013.01); *A23C 1/00* (2013.01); *A23C 1/16* (2013.01); *A23C 21/00* (2013.01); *A23C 21/06* (2013.01); *A23C 2210/05* (2013.01); *C13B 30/002* (2013.01); *C13K 1/10* (2013.01)

(58) Field of Classification Search
CPC .... A23C 1/12; A23C 1/00; A23C 1/16; A23C 21/00; A23C 21/06; A23C 2210/05; C13K 1/10; C13B 30/002
USPC ...................... 426/580, 583, 658; 127/16, 61
See application file for complete search history.

(56) References Cited

U.S. PATENT DOCUMENTS

| | | |
|---|---|---|
| 4,088,791 A | 5/1978 | Jones |
| 5,006,204 A | 4/1991 | Jensen |
| 5,580,592 A | 12/1996 | Nassauer et al. |
| 5,773,061 A | 6/1998 | Getler et al. |
| 6,048,565 A | 4/2000 | Getler et al. |
| 6,335,045 B1 | 1/2002 | Peters et al. |
| 6,790,288 B2 | 9/2004 | Henningfield et al. |
| 7,241,465 B2 | 7/2007 | Keller |
| 7,651,711 B2 | 1/2010 | Keller et al. |
| 7,651,712 B2 | 1/2010 | Keller |
| 7,651,713 B2 | 1/2010 | Keller |
| 7,651,714 B2 | 1/2010 | Keller et al. |
| 7,765,920 B2 | 8/2010 | Keller |
| 2003/0196957 A1 | 10/2003 | Henningfield et al. |
| 2003/0200672 A1 | 10/2003 | Keller |
| 2008/0230051 A1 | 9/2008 | Bonke |
| 2009/0087538 A1 | 4/2009 | Havea |
| 2014/0348979 A1 | 11/2014 | Gonzalez et al. |
| 2014/0348981 A1 | 11/2014 | Smith et al. |
| 2014/0348993 A1 | 11/2014 | Smith et al. |

FOREIGN PATENT DOCUMENTS

| | | |
|---|---|---|
| EP | 0057726 A | 8/1982 |
| EP | 0356071 A2 | 2/1990 |
| EP | 0619075 B1 | 1/1997 |
| GB | 2019189 A | 10/1979 |
| WO | 8200570 A1 | 3/1982 |
| WO | WO-8603942 A1 | 7/1986 |
| WO | WO-97/35486 A1 | 10/1997 |

OTHER PUBLICATIONS

Mockus et al., "Continuous Time Representation Approach to Batch and Continuous Process Scheduling. 1. MINLP Formulation," 1999, Ind. Eng. Chem. Res. 38, 197-2013.*
"International Application Serial No. PCT/US2014/052162, International Search Report dated Nov. 3, 2014", 4 pgs.
"International Application Serial No. PCT/US2014/052162, Written Opinion dated Nov. 3, 2014", 4 pgs.
De Wit, Dr. J.N., "Lecturer's Handbook on whey and whey products", [Online]. Retrieved from Internet: <http://www.euromilk.org/upload/docs/EWPA/Lecturer handbook on Whey.pdf>, (Sep. 1, 2001), 91 pgs.
Second Examination Report from counterpart Australian Patent Application No. 2014308680, dated Dec. 6, 2016, 2 pp.
Response to Examiner's Report dated Sep. 2, 2016, from counterpart Australian Application No. 2014308680, filed Nov. 16, 2016, 10 pp.
Examination Report from counterpart New Zealand Patent Application No. 718309, filed Dec. 16, 2016, 2 pp.
Response to Examination Report dated Jul. 28, 2016, from counterpart New Zealand Application No. 718309 filed Nov. 18, 2016, 11 pp.
First Examination Report from counterpart New Zealand Patent Application No. 718309, dated Jul. 28, 2016, 3 pp.

(Continued)

*Primary Examiner* — Leslie A Wong
(74) *Attorney, Agent, or Firm* — Shumaker & Sieffert, P.A.

(57) ABSTRACT

A process comprises concentrating a whey composition to at least about 75 weight % solids in one or more evaporators connected in series to form a concentrated whey composition, wherein at least one of the evaporators comprises an evaporator configured to agitate the whey composition within the at least one evaporator, crystallizing at least a portion of the lactose in the concentrated whey composition in a crystallization cascade comprising one or more crystallizing stages to form an at least partially-crystallized whey composition and drying the at least partially-crystallized whey composition to form a dried whey product.

10 Claims, 7 Drawing Sheets

(56) References Cited

OTHER PUBLICATIONS

First Examination Report from counterpart Australian Patent Application No. 2014308680 dated Sep. 2, 2016, 3 pp.
Examination Report from counterpart European Application No. 14758270.4 dated Mar. 5, 2018, 5 pp.
Notice of Allowance from counterpart Australian Patent Application No. 2014308680, dated Jul. 21, 2017, 3 pp.
Response to Examination Report dated Mar. 5, 2018, from counterpart European Application No. 14758270.4, filed May 4, 2018, 7 pp.
Response to Examination Report from counterpart New Zealand Patent Application No. 718309, dated Dec. 16, 2016, filed Mar. 6, 2017, 2 pp.
Intent to Grant dated Apr. 23, 2019, from counterpart European Application No. 14758270.4, 44 pp.

* cited by examiner

SYSTEM FOR DRYING ACID WHEY

BACKGROUND

A byproduct of the process for making so-called Greek yogurt, also referred to as "strained yogurt," is a whey having a relatively high concentration of lactic acid. The increased lactic acid content is due to the fermentation of lactose by bacterial cultures used to make yogurt. Lactic acid concentrations from about 5 weight % (wt. %) dry basis to as much as about 13 wt. % dry basis (% DB) can typically be found in Greek yogurt whey. Because of the relatively high concentration of lactic acid present, whey from Greek yogurt production is often referred to as "acid whey" to distinguish it from other wheys that can result from cheese making. Wheys without the elevated levels of acid are typically referred to as "sweet whey." Acid whey can also have a lower concentration of lactose compared to sweet whey because a portion of the lactose is converted to lactic acid in the yogurt making process. For example, acid whey can have a lactose concentration of about 60% DB versus about 70% DB for sweet whey. Typically, acid whey also has a relatively low concentration of protein, e.g., as low as 0.3 wt. % protein and as low as 6% DB when compared to sweet whey which typically has about 12 to 13 wt. % protein. Acid whey from Greek yogurt can often also include elevated levels of galactose, e.g. 5 wt. % or more galactose, a component resulting from the enzymatic breakdown of lactose to glucose and galactose.

In order to preserve various types of whey, it can be desirable to remove most of the moisture to form a dry powder. A particularly desirable product is a so-called "free-flowing" powder. The relatively high lactic acid content, the relatively low lactose content, the relatively low protein content and the relatively high galactose content can make acid whey difficult to dry into a free-flowing powder. Both lactic acid and galactose are hygroscopic and can make the drying of acid whey difficult using traditional whey drying equipment. Both lactose (in its monohydrate form) and high molecular weight proteins are non-hygroscopic and aid in the drying of sweet wheys. Therefore, the reduced concentration of lactose monohydrate and the reduced concentration of high molecular weight proteins in acid whey further complicate the drying of acid whey.

Systems and methods for drying various whey compositions are described in the following patents and patent applications: International Application No. WO 86/03942, published on Jul. 17, 1986 and filed on Dec. 19, 1985; Nassauer et al., U.S. Pat. No. 5,580,592, issued on Dec. 3, 1996; Nassauer et al., EP Patent No. EP0619075B1, granted on Jan. 29, 1997; Getler et al., U.S. Pat. No. 5,773,061, issued on Jun. 30, 1998; Getler et al., U.S. Pat. No. 6,048,565, issued on Apr. 11, 2000; Peters et al., U.S. Pat. No. 6,335,045, issued on Jan. 1, 2002; Benningfield et al., U.S. Pat. No. 6,790,288, issued on Sept. 14, 2004; Keller, U.S. Pat. No. 7,241,465, issued on Jul. 10, 2007; Bonke, U.S. Published Application No. 2008/0230051, published on Sep. 25, 2008 and filed on Mar. 27, 2008; the entire disclosures of all of which are incorporated herein by reference.

SUMMARY

This application describes a process and system for processing a whey composition, for example to dry the whey composition to form a free-flowing powder. The process and system can accommodate the relatively high concentrations of hygroscopic lactic acid and galactose and the relatively lower concentrations of lactose and protein in acid whey from Greek yogurt production.

In an example, the present invention is directed to a process comprising concentrating a whey composition to at least about 75 wt. % solids in one or more evaporators connected in series to form a concentrated whey composition, wherein at least one of the evaporators comprises an evaporator configured to agitate the whey composition within the at least one evaporator, crystallizing at least a portion of the lactose in the concentrated whey composition in a crystallization cascade comprising one or more crystallizing stages to form an at least partially-crystallized whey composition, and drying the at least partially-crystallized whey composition to form a dried whey product.

In another example, the present invention is directed to a process comprising providing or receiving a whey feed composition comprising less than about 70% DB lactose and greater than or equal to about 2.5% DB lactic acid, concentrating the whey feed composition to at least about 85 wt. % total solids in a plurality of evaporators connected in series to form a concentrated whey composition, wherein a last evaporator in the series of evaporators comprises a swept-surface evaporator, cooling the concentrated whey composition in a crystallization cascade to crystallize at least a portion of the lactose in the concentrated whey composition, the crystallization cascade comprising a plurality of crystallizing stages connected in series to form an at least partially-crystallized whey composition, adding a neutralizing compound to the last stage in the series of crystallizing stages to form a mixture of the at least partially-crystallized whey and the neutralizing compound, wherein the neutralizing compound is a compound that reacts with at least a portion of lactic acid in the whey composition to form a reaction product that is less hygroscopic than lactic acid or less soluble in water than lactic acid, or both, and drying the mixture to form a dried whey product.

In yet another example, the present invention is directed to a system for processing a whey composition, the system comprising a supply system for supplying a whey composition, one or more evaporators connected in series, wherein at least one of the evaporators comprises an evaporator configured to agitate the whey composition within the at least one evaporator, the one or more evaporators configured to concentrate the whey composition to at least about 75 wt. % solids to form a concentrated whey composition, a crystallization cascade including one or more crystallizing stages configured to crystallize at least a portion of the lactose in the concentrated whey composition to form an at least partially-crystallized whey composition, and a dryer configured to dry the mixture to form a dried product.

DETAILED DESCRIPTION

Figure 1:
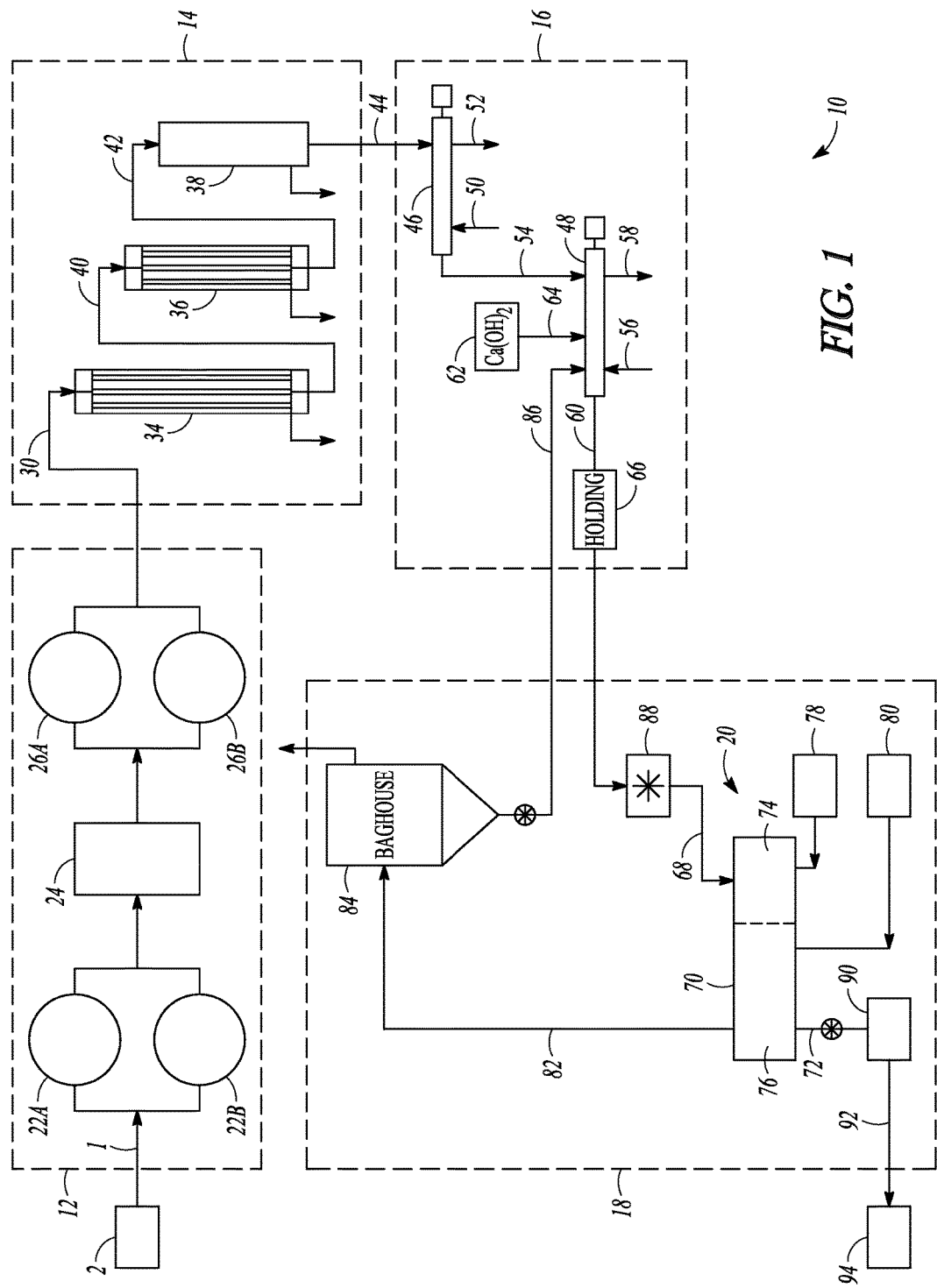
FIG. 1 is a schematic flow diagram of an example system for processing and drying a whey composition, such as acid whey.

This invention provides a process and system for processing a whey composition to form a free-flowing powder. In particular, the process and system can process an acid whey byproduct from Greek yogurt production, which can have one or more of: a relatively high lactic acid content, a relatively high galactose content, a relatively low lactose content, and a relatively low protein content compared to other whey compositions produced in dairy industry processes.

The term "whey composition," as used herein, can refer to one or more whey byproducts formed during processing, such as from milk processing, cheese manufacturing, cream cheese manufacturing, cottage cheese manufacturing, and yogurt manufacturing. The term "whey composition" can also refer to a processed form of another whey composition, such as a whey composition where a further portion of the protein has been removed, such as via microfiltration, ultrafiltration, centrifugation, cyclone separation, or other clarifying or concentration processing of a whey composition produced from milk processing, cheese manufacturing, cream cheese manufacturing, cottage cheese manufacturing, or yogurt manufacturing.

The term "whey product," as used herein, can refer to a processed whey composition (as defined above). For example, a whey composition (as defined above) that has been dried can form a "dried whey product."

The term "acid whey," (sometimes also referred to as "sour whey") as used herein, can refer to particular whey compositions formed from dairy manufacturing processes that involve the use or formation of acid within the whey. In particular, "acid whey" can refer to a whey composition that includes a relatively high concentration of lactic acid. In an example, the process and system of the present invention can dry a whey composition having a lactic acid concentration of greater than or equal to 2.5% DB lactic acid, such as greater than or equal to about 4% DB lactic acid, for example greater than or equal to about 5% DB, greater than or equal to about 5.5% DB, greater than or equal to about 6% DB, greater than or equal to about 6.5% DB, greater than or equal to about 7% DB, greater than or equal to about 7.5% DB, greater than or equal to about 8% DB, greater than or equal to about 8.5% DB, greater than or equal to about 9% DB, greater than or equal to about 9.5% DB, greater than or equal to about 10% DB, greater than or equal to about 10.5% DB, greater than or equal to about 11% DB, greater than or equal to about 11.5% DB, greater than or equal to about 12% DB, greater than or equal to about 12.5% DB, or greater than or equal to about 13% DB. Dairy manufacturing processes that are typically considered as producing "acid whey" include cream cheese manufacturing, cottage cheese manufacturing, ricotta cheese manufacturing and Greek yogurt manufacturing.

The systems and processes described herein are particularly adapted to accommodate acid whey formed as a byproduct of Greek yogurt manufacturing. Fermentation via yogurt cultures used to make Greek yogurt can result in a particularly high concentration of lactic acid in the resulting acid whey. In an example, acid whey from Greek yogurt production can have a lactic acid content of at least about 5% DB lactic acid, such as at least about 9% DB lactic acid, for example at least about 10% DB lactic acid, such as at least about 13% DB lactic acid. Although the processes and systems of the present invention are described as being effective to process acid whey resulting from Greek yogurt production, a person of skill in the art will understand that other acid whey compositions, or other whey compositions, such as acid whey from cottage cheese or cream cheese manufacturing can be processed using the processes and systems of the present invention.

"Acid whey," as used herein, can also have relatively high water content, e.g., can have a relatively small percentage of total solids due to the straining process involved in Greek yogurt production. For example, acid whey can be less than or equal to about 11 wt.% total solids (TS), such as less than or equal to about 6 wt.% TS, for example about 6 wt. % TS, about 5.9 wt. % TS, about 5.8 wt. % TS, about 5.7 wt. % TS, about 5.6 wt. % TS, and about 5.5 wt. % TS. However, an "acid whey" is not limited to these particular solids contents, and can have a higher total solids content and still be considered an "acid whey" within the meaning of this disclosure.

"Acid whey," as used herein, can also have a relatively low lactose content compared to other whey compositions due to the conversion of lactose to lactic acid during fermentation by yogurt cultures. In an example, acid whey can have a lactose content of less than or equal to about 75% DB lactose, such as less than or equal to about 70% DB lactose, such as less than or equal to about 68% DB lactose, such as less than or equal to about 65% DB lactose, for example less than or equal to about 60% DB lactose, for example about 55, 56, 57, 58, 59, 59.5, 60, 61, 62, 63, 64, 65, 66, 67, 68, 69, or 70% DB lactose. The process and system of the present invention can also be useful for whey compositions having higher lactose contents, such as a whey composition that is greater than or equal to 68 wt. % lactose, such as greater than or equal to 75% DB lactose, for example as high as 89% DB lactose.

The acid whey from Greek yogurt production can also have a relatively high content of galactose, another sugar present in dairy products, compared to some whey compositions, such as a galactose content of greater than or equal to about 3% DB galactose, for example greater than or equal to about 5% DB galactose, such as greater than or equal to about 7.5% DB galactose, for example greater than or equal to about 10% DB galactose, such as greater than or equal to about 11% DB galactose. In an example, the process and system of the present invention can dry a whey composition can having a galactose content of about 11.9% DB galactose, or a whey composition having a galactose composition of about 13% DB galactose. Relatively high concentrations of galactose in whey products can render the whey particularly difficult to dry into a free-flowing powder.

"Acid whey," as used herein, can also have a relatively low protein content. One of the purposes of high heat treatment and straining yogurt as part of the Greek yogurt manufacturing process is to increase the protein content in the Greek yogurt. As a result, the protein content in the acid whey byproduct can be relatively low compared to other whey compositions. In an example, the whey composition being dried by the process and system of the present invention can have a protein content of less than or equal to about 10% DB protein, such as less than or equal to about 9% DB protein, for example less than or equal to about 8% DB protein, such as less than or equal to about 7.5% DB protein, for example less than or equal to about 6% DB protein, such as less than or equal to about 5% DB protein, for example less than or equal to about 2.5% DB protein, such as about 1% DB protein.

The relatively high lactic acid content, and in some examples the relatively high galactose content, coupled with the relatively low concentrations of lactose and of protein can make acid whey particularly difficult to dry into a flowable powder. Whey compositions that include a relatively high concentration of lactic acid and, if present, galactose, such as in acid whey, can make the whey composition particularly difficult to dry due to the hygroscopic nature of lactic acid and, if present, galactose. The relatively low concentration of lactose can make acid whey difficult to dry compared to other whey compositions. The drying of lactose has been well studied and is relatively well understood, particularly compared to the drying a lactic acid or galactose. The relatively low concentration of protein can make drying of acid whey more difficult because protein compounds, particularly those present in dairy products, are generally easier to dry than lactose, galactose, or lactic acid.

The dairy industry has had considerably difficulty drying whey compositions having a high concentration of lactose to form flowable powders because solid lactose takes two primary forms: α-lactose monohydrate, which is crystalline and non-hygroscopic; and amorphous lactose, which is hygroscopic. If a substantial percentage of the dried lactose takes the form of amorphous lactose, then the lactose powder will tend to be hygroscopic or tacky and can form a non-flowable paste that can tend to cake together.

In addition, the relatively high concentrations of hygroscopic lactic acid in acid whey, as described above, can make acid whey particularly difficult to dry into a flowable powder because the hygroscopic nature of lactic acid will tend to cause the powder particles to absorb moisture from the atmosphere resulting in particles that stick together and become non-flowable.

Prior to the processes and systems described herein, it was common for producers to avoid drying acid whey altogether and simply dispose of the acid whey in its liquid form. However, there can be environmental concerns with the disposal of acid whey, for example, oxidation of the lactose, proteins, and lactic acid in acid whey can limit or exhaust the oxygen supply in waterways if the acid whey were to make its way into lakes, rivers, or streams. Some Greek yogurt producers have resorted to paying third parties to dispose of the acid whey for them, such as by paying farmers to use the acid whey as a feed supplement for livestock or to spread it on fields.

The increasing popularity of Greek yogurt has led to larger and larger quantities of acid whey being produced. The processes and systems of the present invention can convert the liquid acid whey into a free-flowing solid powder product that is non-caking. The resulting powder can be stored, transported, and sold more easily and economically compared to liquid acid whey. A dry powder product can be a commercial product for several industries, including, but not limited to, a feed supplement for farm animals such as pigs or cows, a food supplement for human consumption, and an additive for food preparation industry such as an additive for baking products.

The processes and systems described herein can accommodate the relatively high lactic acid content, the relatively high galactose content (if present), the relatively low lactose content, and the relatively low protein content of acid whey, particularly acid whey resulting from Greek yogurt production. The processes and systems described herein can also be more energy efficient than previous systems and processes for drying whey compositions.

FIG. 1 is a schematic diagram of a system 10 configured to process a whey composition such as acid whey 1 produced in a Greek yogurt manufacturing process. The example system 10 can include a whey feed system 12 configured to receive the acid whey 1 and transfer it to the rest of the system 10, a concentration system 14 for concentrating the acid whey 1, such as via reverse osmosis, or evaporation, or both, a crystallization system 16, and a drying system 18.

The whey feed system 12 can receive the acid whey 1 from a whey composition supply such as a whey supply 2, for example from a Greek yogurt producer. The whey feed system 12 can include various pre-conditioning stages, such as one or more receiving tanks 22A, 22B, a pasteurizer 24, and one or more concentration feed tanks 26A, 26B. Operation of holding tanks and pasteurizers are well known in the dairy processing industry. The whey feed system 12 can feed the pre-conditioned whey composition, such as the acid whey 1, into a concentration feed line 30 that can feed into the concentration system 14.

The concentration system 14 can include one or more unit operations configured to concentrate the whey composition in the concentration feed line 30, such as an acid whey (referred to as "acid whey 30" for brevity). The terms "concentrate," "concentrating," or "concentration," as used herein, can refer to increasing the total solids content of the whey composition, e.g., the acid whey 30, such as by removing water from the acid whey 30 to produce a concentrated whey composition.

Removal of water from the acid whey 30 in order to concentrate the acid whey 30 in the concentration system 14 can be accomplished via one or more reverse osmosis devices or one or more evaporators, or both, such as a plurality of evaporators connected in series. In the example shown in FIG. 1, the concentration system 14 includes a first evaporator 34, a second evaporator 36, and a third evaporator 38. The evaporators 34, 36, 38 are connected in series, with a concentrated whey composition outlet from the first evaporator 34 (e.g., a first intermediate concentrated acid whey 40) being fed into the second evaporator 36, and a concentrated whey composition outlet from the second evaporator 36 (e.g., a second intermediate concentrated acid whey 42) being fed into the third evaporator 38. The output of the series of one or more evaporators 34, 36, 38 is a concentrated whey composition such as a concentrated acid whey 44 that can be fed into the crystallization system 16.

In an example, the first and second evaporators 34, 36 can be vacuum evaporators, such as falling film vacuum evaporators such as those typically used in the dairy industry. However, other types of water removal equipment can be used without varying from the scope of the present invention. As described above, the acid whey 30 fed to the first evaporator 34 can be less than or equal to about 11 wt. % total solids (TS), such as about 6 wt. % TS. The evaporator 34 can concentrate the acid whey 30 by evaporating water therefrom to form the first intermediate concentrated acid whey 40. In an example, the first intermediate concentrated acid whey 40 can have a total solids concentration of at least about 40 wt. % TS and as much as at least about 70 wt. % TS, for example about 60 wt. % TS. Because of this relatively low total solids concentration, the first evaporator 34 can be referred to as a low-concentration evaporator 34.

The first intermediate concentrated acid whey 40 is fed into the second evaporator 36. The second evaporator 36 can concentrate the first intermediate concentrated acid whey 40 by evaporating water therefrom, to form the second intermediate acid whey 42. In an example, the second intermediate concentrated acid whey 42 can have a total solids concentration of at least about 65 wt. % TS, such as at least about 80 wt. % TS, for example about 75 wt. % TS. Because of the increased solids concentration in the second intermediate concentrated acid whey 42, the second evaporator 36 can be referred to as the high-concentration evaporator 36.

The second intermediate concentrated acid whey 42 is fed into the third evaporator 38, where the third evaporator 38 evaporates additional water from the second intermediate concentrated acid whey 42 to form the concentrated acid whey 44 that can be fed into the crystallization system 16. In an example, the concentrated acid whey 44 can have a total solids concentration of at least about 70 wt. % TS, such as at least about 75 wt. % TS, for example at least about 80 wt. % TS, for example at least about 85 wt. % TS, for example about 87 wt. % TS, or even as much as 92 wt. % TS.

The third evaporator 38 can concentrate the acid whey therein to such a degree that the solution has a very high viscosity that renders it difficult if not impossible to provide further concentration of the whey composition above about 70 wt. % to 75 wt. %, particularly within a falling film evaporator, which is a typical evaporator used for whey concentration.

Despite this difficulty in concentrating the acid whey above a certain total solids content due to the high viscosity of the concentrated acid whey, it can be desirable to maximize the concentration that can occur in the concentration system 14 because evaporators, such as evaporators 34, 36, 38, can be more energy efficient than other concentration equipment, and in particular is substantially more energy efficient than air dryers. In order to counteract the higher viscosity of the acid whey, the third evaporator 38 can comprise an apparatus configured to agitate the higher-viscosity acid whey within the third evaporator 38, such as with a rotor or with a high shear rate generated by pumping. For example, the third evaporator 38 can include an internal mechanism within the third evaporator 38 that can agitate the liquid within the third evaporator 38. The internal mechanism can therefore maintain a high degree of turbulence in the liquid portion of the acid whey within the third evaporator 38. For this reason, the third evaporator 38 can be referred to as a swept-surface evaporator 38 (also referred to as a scraped-surface evaporator, a wiped-surface evaporator, or similar language).

As described in more detail below with respect to FIGS. 2 and 3, the swept-surface evaporator 38 can include one or more blades or scrapers that are position adjacent to or in contact with the inner surface or surfaces of the swept-surface evaporator 38 that are to be cleared. The one or more blades or scrapers can be attached to a moving shaft, frame, or other mechanism that will move the one or more blades or scrapers across or along the interior surface or surfaces of the swept-surface evaporator 38. The blades or scrapers can agitate the liquid within the swept-surface evaporator 38, for example to create turbulent mixing of the high-viscosity acid whey, to maximize heat transfer efficiency and to prevent deposition of solids on the heat transfer surface of the swept-surface evaporator 38.

An evaporator or evaporation system other than a swept-surface evaporator can be used to provide for the final stage of concentration of the acid whey so long as the evaporator or evaporation system is configured to handle and concentrate high-viscosity liquids such as acid whey having a total solids content of at least 75 wt. %, and in particular at least about 85 wt. %. An example of another evaporator that can be used for the final stage of evaporation is a forced-circulation evaporator such as a forced circulation plate evaporator.

After concentration in concentration system 14, the resulting concentrated acid whey 44 can have a total solids content of at least about at least about 70 wt. % TS, such as at least about 75 wt. % TS, for example at least about 80 wt. % TS, for example at least about 85 wt. % TS, for example about 87 wt. % TS, or even as much as 92 wt. % TS, as noted above. The concentration system 14 can be configured to allow the total solids content of the concentrated whey composition coming out of the concentration system 14, e.g., the concentrated acid whey 44, to be as high as is practical while still providing for a flowable or easily transportable concentrated whey composition and to provide sufficient water in the concentrated acid whey 44 to permit the formation of α-lactose monohydrate from the lactose present in concentrated acid whey 44. The use of a swept-surface or forced-circulation type of evaporator as the last evaporator 38 in the series of evaporators of the concentration system 14 can provide for maximized total solids while preventing or reducing burning or other degradation of the lactose and other components of the whey composition on the heating surface.

The crystallization system 16 can receive the concentrated acid whey 44 from the concentration system 14 and can modify the concentrated acid whey 44 to perform one or more steps of cooling the acid whey 44 and crystallizing at least a portion of the lactose in the acid whey 44, e.g., to form α-lactose monohydrate rather than amorphous lactose. The crystallization system 16 can include a crystallization cascade comprising one or more crystallizing stages that are configured to crystallize at least a portion of the lactose in the acid whey 44.

In the example shown in FIG. 1, the crystallization system 16 can include one or more crystallization stages 46, 48 in the form of mixers 46, 48. The crystallization stages/mixers 46, 48 can be configured to mix and agitate acid whey in order to promote uniform crystallization of lactose to the α-lactose monohydrate form. As the crystallization of lactose to α-lactose monohydrate progresses in crystallization system 16, the composition of the acid whey 44 can become thicker and more difficult to uniformly mix. In an example, each of the one or more mixers 46, 48 can be configured to mix highly viscous pastes or slurries, such as pug mill mixers described in more detail in FIGS. 4-6.

Each mixer 46, 48 can be configured to cool the acid whey, which, along with agitating the acid whey, can promote crystallization of the lactose to the a-lactose monohydrate form. The crystallization of lactose to α-lactose monohydrate can generally be controlled by the temperature to which the lactose is cooled. In an example, the whey composition can be cooled to a temperature of about 60° C. or less within the crystallization system 16, such as about 30° C. or less, for example about 10° C. or less.

In order to cool the whey composition to the desired temperature, a cooling fluid can be fed to each mixer 46, 48 to cool the acid whey to promote lactose crystallization. A first cooling fluid can be fed through the first mixer 46 via a cooling fluid inlet 50 and a cooling fluid outlet 52. The first cooling fluid can be configured (e.g., fluid composition, temperature, and flow rate) to cool the concentrated acid whey 44 to a first temperature within the first mixer 46. By cooling the concentrated acid whey 44 to the first temperature, a portion of the lactose can be crystallized to form an intermediate partially-crystallized whey composition such as an intermediate partially-crystallized acid whey 54, which can be fed into the second mixer 48. In an example, at least about 10 wt. % of the lactose in the intermediate partially-crystallized acid whey 54 has been crystallized as α-lactose monohydrate, for example at least about 50 wt. %, such as about 70 wt. % of the lactose being crystallized as α-lactose monohydrate.

A second cooling fluid can be fed through the second mixer 48 via a cooling fluid inlet 56 and a cooling fluid outlet 58. The second cooling fluid can be configured (e.g., fluid composition, temperature, and flow rate) to cool the intermediate partially-crystallized acid whey 54 to a second temperature within the second mixer 48. In an example, the second temperature is lower than the first temperature in the first mixer 46. By cooling the intermediate partially-crystallized acid whey 54 to the second temperature, additional lactose can be crystallized to form an at least partially-crystallized whey composition, such as an at least partially-crystallized acid whey 60, wherein a higher percentage of the lactose in the crystallized acid whey 60 has been crystallized to the α-lactose monohydrate form compared to the intermediate partially-crystallized acid whey 54. In an example, at least about 50 wt. % of the lactose in the crystallized acid whey 60 has been crystallized as α-lactose monohydrate, for example at least about 80 wt. %, such as at least about 95 wt. %, and in some examples 100 wt. % of the lactose being crystallized as α-lactose monohydrate.

Other factors that can determine the degree of lactose crystallization to α-lactose monohydrate include, but are not limited to, the amount of time that the whey composition is cooled within the mixers 46, 48 and the degree of mechanical mixing of the whey composition in terms of the force of mixing and the uniformity of the whey composition during mixing.

In an example, the first cooling fluid fed to the first mixer 46 can be cooling water at a first temperature, e.g., with an inlet temperature of about 30° C. The second cooling fluid fed into the second mixer 48 can be a cooling water at a second temperature, which can be lower than the first temperature of the first cooling fluid, e.g., with an inlet temperature of about 4° C.

Although FIG. 1 shows an example system 10 with two mixers 46, 48 as part of the crystallization system 16, the processes and the system of the present invention are not so limited. Rather, a system could include only one mixer, or could include three or more mixers, with varying configurations of cooling of the mixers to achieve the desired degree of crystallization. The number of stages/mixers in the crystallization system 16 can depend on the designed production rate of the overall system, wherein a larger production rate through the crystallization system 16 can lead to a higher number of mixers.

As described above, the presence of lactic acid in a whey composition can make drying of the whey composition difficult because of the hygroscopic nature of lactic acid. The lactic acid can also make the solid powder thermoplastic during drying, which can lead to further agglomeration and non-flowability of the powder. The system 10 can be configured to counteract the effects of the lactic acid in the whey composition being processed.

A neutralizing compound 62 can be added to a whey composition at one or more stages of the system 10 in order to neutralize at least a portion of the lactic acid therein. The terms "neutralize" and "neutralizing," as used herein, can refer to converting the lactic acid to a compound that is less hygroscopic than lactic acid, less soluble in water than lactic acid, or both. "Neutralize" or "neutralizing" does not necessarily refer to neutralizing the acid (e.g., reacting the lactic acid with a base to form water and a "neutralized" reaction product, usually a salt). However, as demonstrated below, the "neutralizing," as used herein to refer to converting to a less hygroscopic and/or a less water soluble compound, can involve neutralizing the acid in the more commonly used chemical meaning.

The neutralizing compound 62 and the whey composition (e.g., acid whey) can be mixed together to form a mixture so that the whey composition exiting the crystallization system 16, e.g., the crystallized acid whey 60, comprises a mixture of the neutralizing compound 62 (and/or a reaction product of the neutralizing compound 62 and lactic acid) and the whey composition that was at least partially crystallized. The neutralizing compound 62 can include a compound that can react with the lactic acid to form one or more reaction products that are less hygroscopic than lactic acid, less water soluble than lactic acid, or both, so that the resulting mixture of the one or more reaction products and at-least partially crystallized lactose is less hygroscopic, less water soluble, or both, than it would be if at least the portion of the lactic acid had not been neutralized. In an example, the neutralizing compound 62 can comprise one or more salts capable of reacting with the lactic acid, the one or more salts comprising a cation of one of the following elements or groups: Ag, Al, Ba, Bi, Ca, Co, Cu, Fe, K, Mn, Na, $NH_4$, Pb, St, or Zn. A multivalent metal cation can be preferred over a univalent cation because the resulting multivalent metal lactate can tend to be less soluble in water, and thus typically also less hygroscopic compared to a corresponding univalent metal lactate.

Further examples of neutralizing compounds that can be used to neutralize lactic acid include, but are not limited to, at least one of hydroxides, carbonates, sulphates, phosphates, and polyphosphates and other similar products known to those of skill in the art. In an example, the neutralizing compound can include a salt of a multivalent metal and a hydroxide (e.g., calcium hydroxide ($Ca(OH)_2$) or magnesium hydroxide ($Mg(OH)_2$) or a salt of a multivalent metal and a carbonate (such as calcium carbonate ($CaCO_3$) or magnesium carbonate ($MgCO_3$). As noted above, a multivalent metal hydroxide or carbonate, such as a divalent metal hydroxide or carbonate, can be preferred over a univalent hydroxide or a univalent carbonate because the resulting multivalent metal lactate can tend to be less soluble in water compared to a corresponding univalent metal lactate. For example, calcium lactate ($Ca(CH(OH)COO)_2$), a divalent metal lactate, has a solubility in water of about 0.079 g/mL water, while sodium lactate ($NaCH(OH)COO$, a univalent metal lactate, has a solubility in water of greater than 1.5 g/mL water, such that sodium lactate is more than 18 times as soluble in water as calcium lactate. Sodium lactate would is also expected to be more hygroscopic than calcium lactate.

In the example where calcium hydroxide is used as the neutralizing compound 62, the neutralization of lactic acid proceeds according to Equation 1:

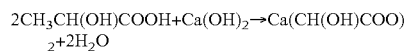

$$2CH_3CH(OH)COOH + Ca(OH)_2 \rightarrow Ca(CH(OH)COO)_2 + 2H_2O \quad [1]$$

As shown in the example system 10 of FIG. 1, the neutralizing compound 62 can be fed into one of the crystallizing stages of the crystallization system 16, e.g., by feeding a solid powder form of the neutralizing compound 62 via a feed line 64 from a metered feeding device into at least one of the mixers 46, 48. A slurry or solution of the neutralizing compound can also be fed into at least one of the mixers. In the case of a crystallizing stage that comprises a mixer 48, the neutralizing compound 62 can be added proximate to a feed end of the mixer 48, e.g., proximate to an end where the whey composition (e.g., the intermediate partially-crystallized acid whey 54) is added into the mixer 48, so that the neutralizing compound 62 and the intermediate partially-crystallized acid whey 54 can be thoroughly mixed throughout the length of the mixer 48 to form a mixture of the neutralizing compound 62 and the crystallized acid whey 60. Further details of the example mixer 46, 48 are described below with respect to FIGS. 4-6.

The neutralizing compound 62 can be added at any stage of the process that can provide for effective neutralizing of at least a portion of the lactic acid in the whey composition that is being processed by the system 10, and in particular for effective neutralizing of at least a portion of the lactic acid prior to the drying system 20. Examples of points of the system other than the crystallization system 16 to which the neutralizing compound 62 can be added include a point upstream of the concentration system 14, into the concentration system 14 (e.g., into one of the evaporators 34, 36, 38), to a point downstream of the concentration system 14 but upstream of the crystallizing system 16, and downstream of the crystallizing system 16.

In some examples, it can be desirable to add the neutralizing compound 62 downstream of the concentration system 14, and particularly downstream of the evaporators 34, 36, 38, because the neutralizing compound 62 can result in fouling of the evaporators, e.g., by calcium or magnesium deposition onto the inner walls of the evaporator. It can also be desirable to add the neutralizing compound 62 to a portion of the process that has a relatively low temperature, e.g., below about 50° C. so as to minimize browning of the mixture via the Maillard reaction. It can also be desirable to add the neutralizing compound 62 early enough in the process that the neutralizing reaction, e.g., reaction 1, can take place to the extent that a desired amount of the lactic acid is neutralized, that is converted to a less hygroscopic and/or less soluble compound.

In the example shown in FIG. 1, the neutralizing compound 62 is added to the last crystallizing stage of the crystallization cascade of the crystallization system 16, e.g., proximate to the inlet end of the second mixer 48 in the series of mixers 46, 48 in FIG. 1.

In an example, the neutralizing compound 62 can be added in an amount that is sufficient to neutralize a predetermined amount of the lactic acid expected to be in the whey composition. The predetermined amount of the lactic acid that is to be neutralized can depend on the desired final product to be produced by the system 10. In certain concentrations, lactic acid is known to provide for a pleasing flavor, both to animals and to humans. Therefore, if flavor of the final product is a consideration, such as if the final product is to be as an additive for baking products for human consumption, then an amount less than all (100%) of the lactic acid can be neutralized using the neutralizing compound 62. If flavor is not a concern, such as if the final product is to be an additive for livestock feed, then the neutralizing compound 62 can be added so that all or a substantial portion of the lactic acid (e.g., at least about 50%) is neutralized.

In an example, the neutralizing compound 62 can be added in an amount that is theoretically capable of neutralizing all (100%) of the lactic acid expected to be present. The neutralizing compound 62 can also be added in an amount that is a smaller percentage than would be needed to neutralize all of the lactic acid. Alternatively, the neutralizing compound 62 can be added in an excess amount that is larger than the amount needed for theoretically complete neutralization, for example to accommodate incomplete reaction between the neutralizing compound 62 and the lactic acid.

For example, if calcium hydroxide is being used as the neutralizing compound 62, then according to Equation 1, 0.5 moles of calcium hydroxide is necessary to neutralize each mole of lactic acid, or about 0.41 grams of calcium hydroxide per gram of lactic acid (molar mass of calcium hydroxide is approximately 74.1 g/mol, and the molar mass of lactic acid is about 90.1 g/mol). Therefore, if, for example, the intermediate partially-crystallized acid whey 54 is 8.4 wt. % lactic acid (e.g., 9.6% DB lactic acid in a composition that is about 87 wt. % total solids), for 100% theoretical neutralization, about 34.2 grams of calcium hydroxide would be added per kg of the intermediate partially-crystallized acid whey 54 being fed to the mixer 48. If an excess of 20% beyond theoretical neutralization was desired, then about 41.1 grams of calcium hydroxide would be added per kg of the intermediate partially-crystallized acid whey 54 being fed into the mixer 48. If only 50% of theoretical neutralization is desired, than about 17.1 grams of calcium hydroxide would be added per kg of the intermediate partially-crystallized acid whey 54 being fed into the mixer 48.

It is known in the art that when the crystallization of the lactose has been started, e.g., in the mixers 46, 48, then the lactose can further crystallize simply by allowing the lactose-comprising composition to rest relatively undisturbed for a predetermined period of time, such as for from about 5 minutes to about 24 hours. Therefore, the crystallization system 16 can include a holding stage 66 downstream of the final stage of the crystallization cascade (e.g., the second mixer 48). The holding stage 66 can allow the lactose in the at least partially-crystallized whey 60 to further crystallize. Examples of structures or devices that can form the holding stage 66 can include, but are not limited to, a holding area where the material is allowed to sit for the predetermined period of time, a conveyer belt with a cycle time equal to the predetermined holding time, or a rotating conveyer disc where the time that the at least partially-crystallized whey 60 is on the disc is equal to the predetermined period of time. An at least partially crystallized whey composition 68 exits the holding stage 66 and is fed into the drying and finishing system 18.

The finishing system 18 can include equipment configured to modify the liquid, slurry, paste or cake into a final form of a free-flowing powder. As noted above, the finishing system 18 can include a drying system 20 that is configured to dry the at least partially-crystallized whey composition exiting the crystallization system 16 into a friable material. The drying system 20 includes a dryer 70 configured to dry the crystallized acid whey 60, e.g., to remove additional water so that a product 72 that exits the dryer 70 has a solids content of at least about 92 wt. % TS, such as at least about 94 wt. % TS, for example at least about 96 wt. % TS.

As is known in the art, a typical dryer for drying a whey composition has been a spray dryer, e.g., a drying chamber into which the material to be dried is dispersed (e.g., aspirated or atomized, such as through a spray nozzle or rotary atomizer). A drying fluid, typically hot air, is fed into the drying chamber. An objective of the present invention is to configure the system 10 so that the solids content of the crystallized whey 68 is sufficiently high so that a spray dryer is not necessary. In some examples, the consistency of the crystallized whey 68 can be too viscous or paste-like to be sprayed in a spray dryer. Therefore, in the examples, the dryer 70 is not a spray dryer.

In the example shown in FIG. 1, the dryer 70 is a fluidized bed dryer 70. The fluidized bed dryer 70 can include a heating zone 74 and a cooling zone 76. A hot air stream 78 at a drying temperature, e.g., about 130° C. can be fed into the heating zone 74, and a cooling air stream 80 at a cooler temperature, e.g., about 10° C. can be fed into the cooling zone 76. Other types of dryers, such as drum dryers, can be used without varying from the scope of the present invention.

The fed air 78 and 80 can exit the dryer 70 through an exhaust line 82 that can be fed into a baghouse 84 that can collect fine particles 86 that are entrained by the hot air in the exhaust line 82. Alternately, a powder recovery cyclone can be used for recovering fines 86 from the exhaust line 82. The fines 86 can be recycled back to a previous stage of the system 10, such as by feeding the fines into the last crystallizing stage of the crystallization system 16, e.g., into the second mixer 48 in the example system 10 of FIG. 1. Alternately, the fine particles 86 can be collected and packaged separate from the main stream powder 92.

The finishing system 18 can include a chopper 88 that can be configured to break up paste-like crystallized acid whey 60 coming out of the crystallization system 16 before it enters the dryer 70. The finishing system 18 can also include a mill 90 configured to grind the solid 72 coming out of the dryer 70 to a free-flowing powder 92. The free-flowing powder 92 can then be transferred to a packaging system 94 where the powder 92 can be packaged for delivery to customers.

Figure 2:
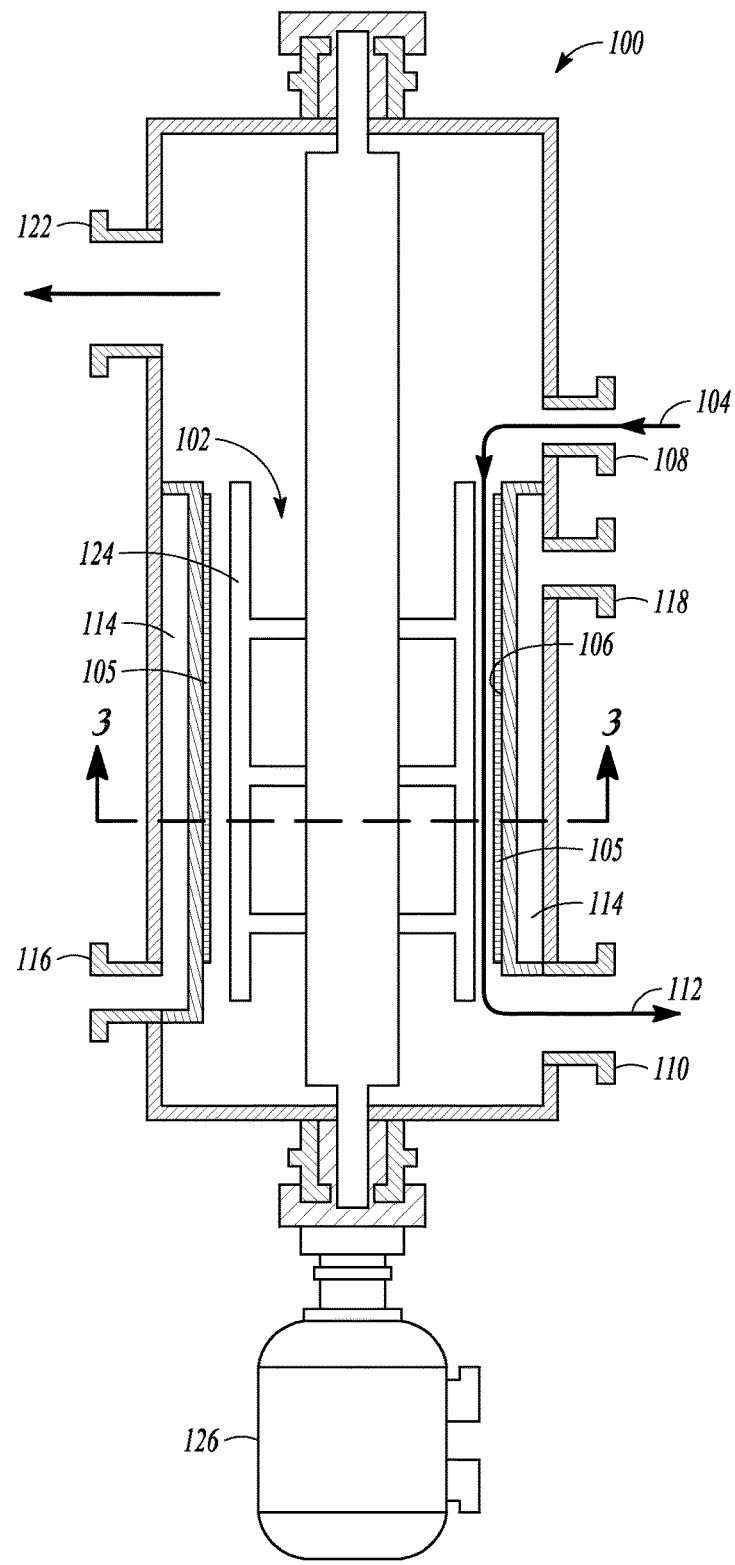
FIG. 2 is a side sectional view of an example evaporator that can be used for one or more stages of evaporation within the example system of FIG. 1.
Figure 3:
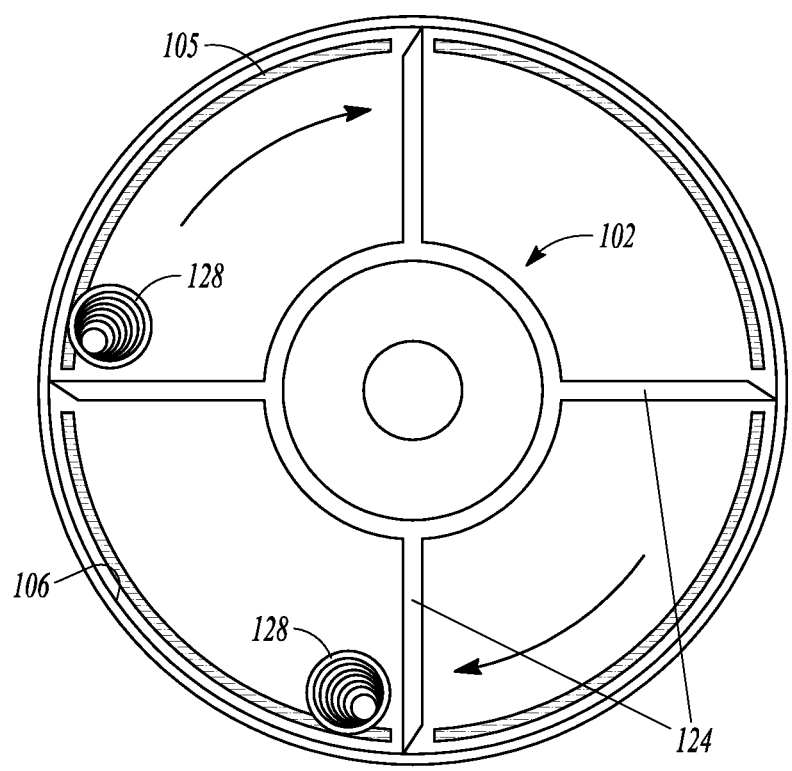
FIG. 3 is a cross-sectional view of the example evaporator taken along line 3-3 in FIG. 2.

FIGS. 2 and 3 show an example swept-surface evaporator 100 that can be used as at least one of the evaporators 34, 36, 38 of the concentration system 14 of the system 10, and in particular as the final evaporator 38 of the series of evaporators 34, 36, 38. As discussed briefly above, the swept-surface evaporator can include a sweeping mechanism 102 that can agitate a whey composition 104 being concentrated so that the whey composition 104 has a turbulence that is large enough to provide for uniform mixing within the swept-surface evaporator 100 and to prevent sticking of whey composition 104 to the heating surface.

The swept-surface evaporator 100 can include a whey composition inlet 108 and a whey composition outlet 110 through which the whey composition 104 is fed and the concentrated whey composition 112 exits, respectively. The inner heating surface 106 can be heated to evaporate water from the whey composition 104. In an example, a heating jacket 114 can provide the heating source for the heating surface 106. A heating fluid inlet 116 can provide heating fluid, such as steam, to the heating jacket 114, and a heating fluid outlet 118 can withdraw the heating fluid from the heating jacket 114. As the whey composition 114 moves through the swept-surface evaporator 100, water vapor 120 can evaporate and exit the swept-surface evaporator 100 via a vapor exhaust 122.

The sweeping mechanism 102 can include one or more wipers or mixing blades 124 that can be configured to pass in close proximity to or to be in contact with the inner heating surface 106. The sweeping mechanism 102 can include a motor 126 that is configured to rotationally drive the one or more mixing blades 124 so that the one or more mixing blades 124 pass over the inner heating surface 106. As shown in FIG. 3, the sweeping mechanism 102 can be configured so that the wiping action of the one or more mixing blades 124 results in the formation of a relatively thin film 105 of the whey composition 104 on the inner heating surface 106. In addition, the close proximity of the mixing blades 124 to the inner heating surface 106 and the speed of the mixing blades 124 can result in turbulent mixing of the whey composition 104, shown conceptually as eddies 128 in FIG. 3. Turbulent mixing of the whey composition 104 can result in uniform heating of the whey composition 104 and can also act to prevent or reduce buildup of solid or paste-like components of the whey composition 104 on the inner heating surface 106. The turbulent mixing of the whey composition 104 with the mixing blades 124 can provide for greater evaporation of water from the whey composition 104 than with other evaporator configurations. Therefore, the swept-surface evaporator 100 can provide for a higher potential total solids concentration than other evaporator configurations, e.g., as high as at least 70 wt. % TS, for example at least 75 wt. % TS, such as at least 85 wt. % TS, for example about 87 wt. % TS, such as at least about 92 wt. % TS. Configurations of swept surface evaporators or other mechanically-aided evaporators other than the vertical swept surface evaporator shown in FIG. 2 can be used without varying from the scope of the present invention. For example, a generally horizontally oriented mechanically-aided evaporator could be used.

Figure 4:
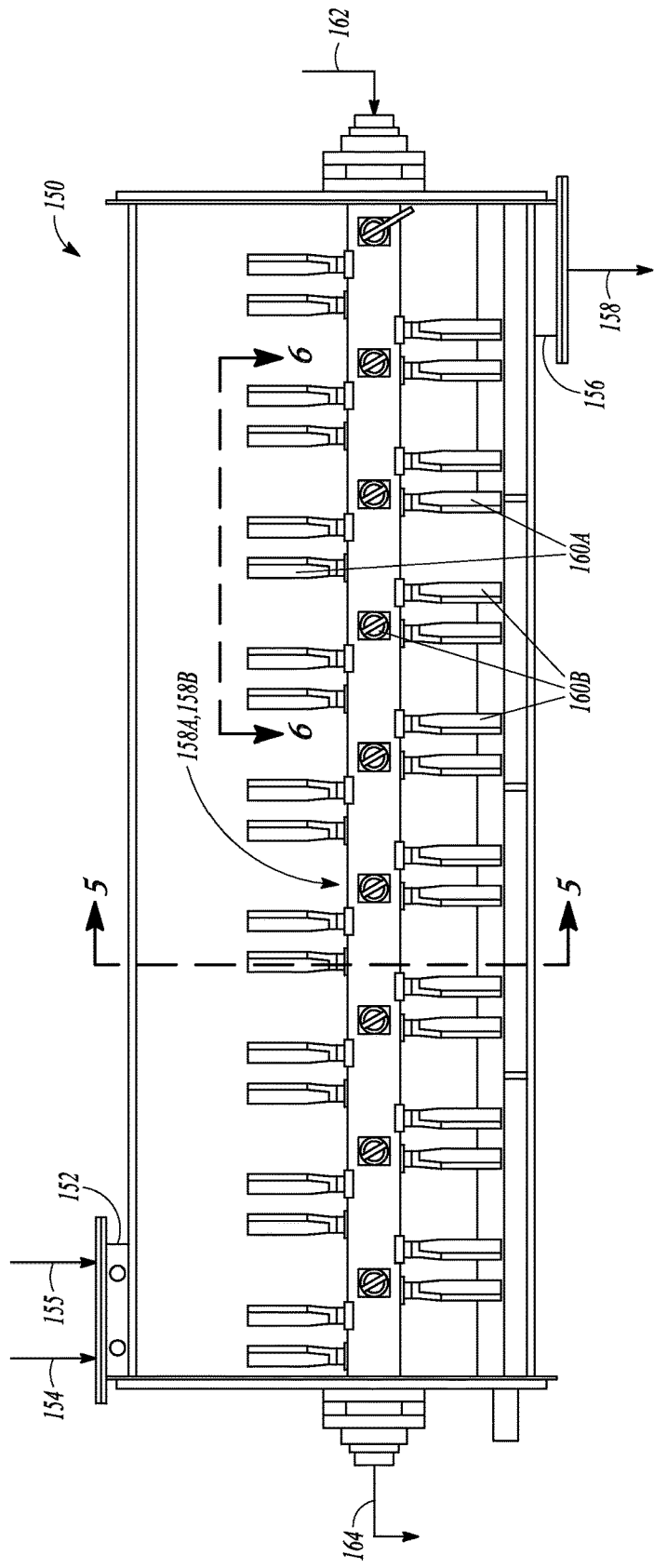
FIG. 4 is a side cross-sectional view of an example mixer that can be used to cool and crystallize concentrated acid whey when in the example system of FIG. 1.
Figure 5:
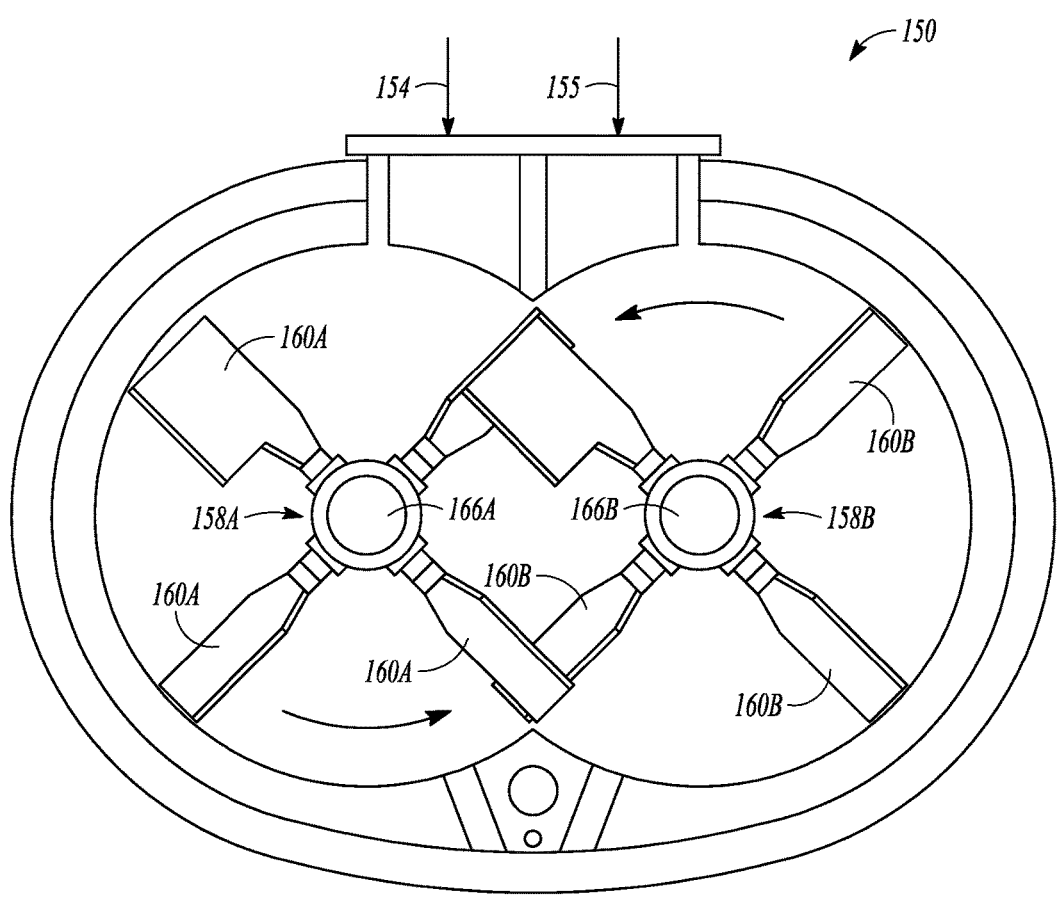
FIG. 5 is a cross-sectional view of the example mixer taken along line 5-5 in FIG. 4.
Figure 6:
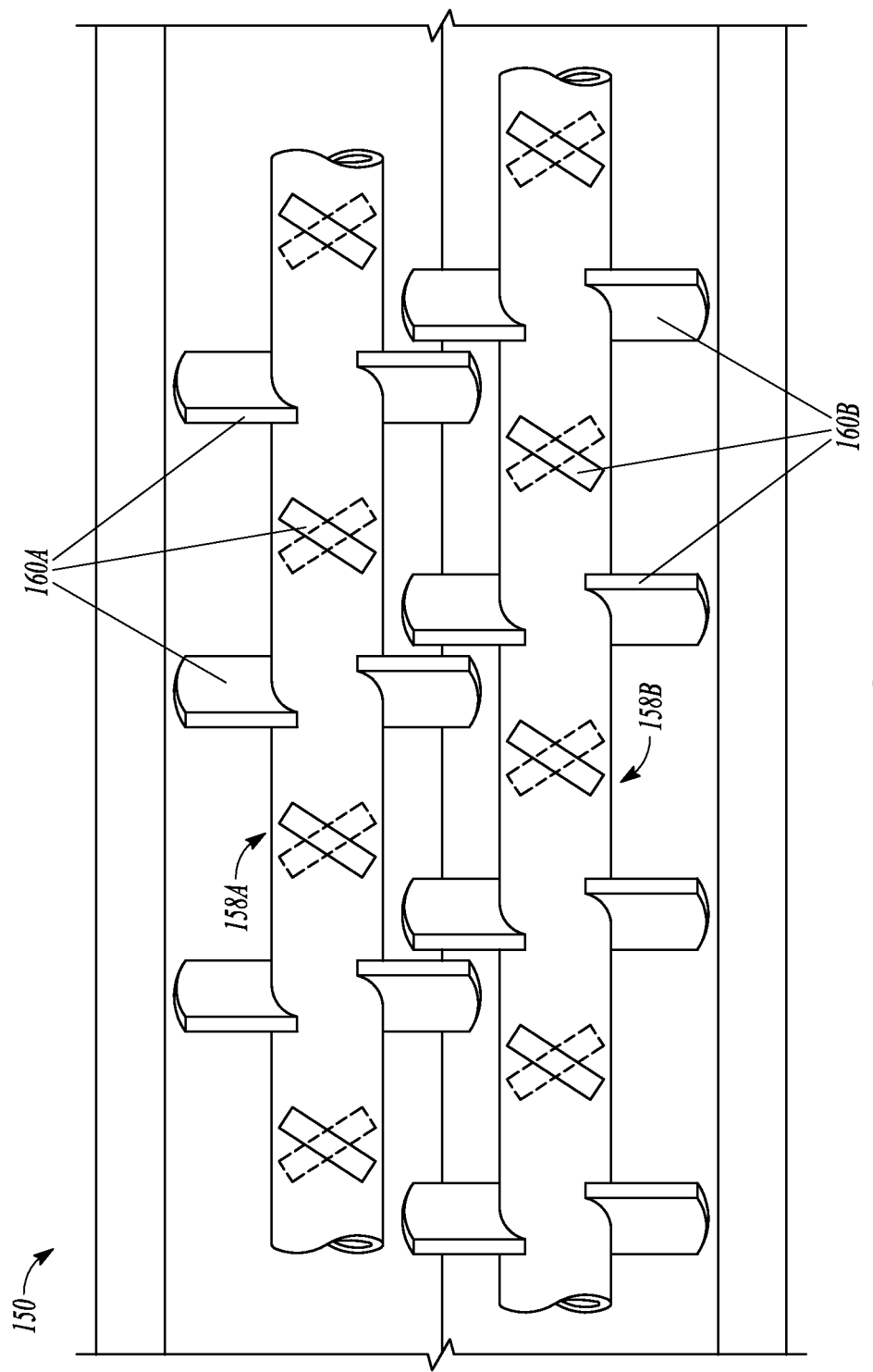
FIG. 6 is a top view of a portion of the example mixer taken along line 6-6 in FIG. 4

FIGS. 4-6 show an example mixer 150 that can be used as one of the stages of the crystallization cascade of the crystallization system 16, for example as the mixer 46 or the mixer 48 in the system 10 of FIG. 1. The mixer 150 can include an inlet 152 for receiving the composition to be mixed, such as a whey composition 154 and a neutralizing compound 155. The whey composition 154 can be a concentrated whey composition received from a concentration system, such as the concentrated acid whey 44 received by the mixer 46 or the partially-crystallized acid whey 54 received by the mixer 48 in FIG. 1. The neutralizing compound 155 can be, for example, the neutralizing compound 62 (e.g., $Ca(OH)_2$) received by the mixer 48 in FIG. 1. The mixer 150 can also include an outlet 156 where a mixed and at least partially-crystallized whey composition 158 can exit the mixer 150.

The example mixer 150 shown in FIGS. 4-6 is what is generally referred to as a pug mill mixer 150. The pug mill mixer 150 can include a pair of rotating shafts 158A, 158B (best seen in FIGS. 5 and 6). The rotating shafts 158A, 158B can each include a plurality of mixing paddles 160A, 160B that are configured to agitate the highly viscous or paste-like whey composition 154. As best seen in FIG. 6, the mixing paddles 160A of the first rotating shaft 158A are closely interlaced with the mixing paddles 160B of the second rotating shaft 158B so that as the shafts 158A, 158B are rotated, the mixing paddles 160A, 160B pass in close proximity to each other in order to thoroughly mix the whey composition 154 and, if present, the neutralizing compound 155 and to prevent excessive adhesion of whey composition 154 to adjacent mixing paddles 160A, 160B.

As described above, the mixer 150 can be used to cool the whey composition 154 in order to crystallize lactose in the whey composition 154 to the non-hygroscopic form of lactose, α-lactose monohydrate. The mixer 150 can be cooled with a cooling fluid, such as cooling water, fed through a cooling fluid inlet 162 and withdrawn from a cooling fluid outlet 164. The mixer 150 can be configured so that the cooling fluid flows through an interior bore 166A, 166B of each of the rotating shafts 158A, 158B (FIG. 5). The cooling fluid can act to cool the shafts 158A, 158B and the mixing paddles 160A, 160B, which in turn can cool the whey composition 154 as it is being mixed. As shown in FIG. 4, the cooling fluid can be fed to the mixer 150 in a counter-current fashion relative to the whey composition 154, with the cooling fluid inlet 162 being proximate to the whey composition outlet 156 and the cooling fluid outlet 164 being proximate to the whey composition inlet 152. A co-current cooling fluid arrangement could also be used if desired. The mixer 150 can also include a cooling jacket (not shown) in addition to or instead of passing the cooling fluid through the rotating shafts 158A, 158B.

Figure 7:
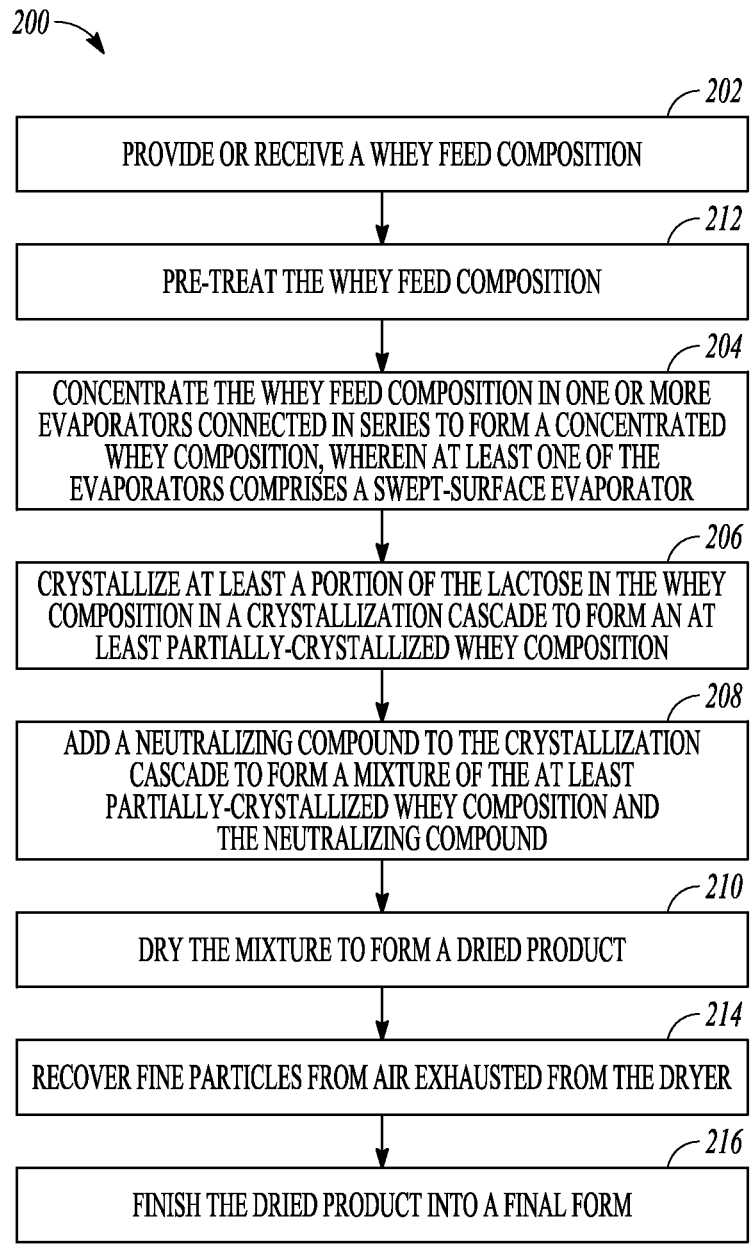
FIG. 7 is a flow diagram of an example process of drying a whey composition, such as acid whey.

FIG. 7 is a flow diagram of a process 200 of drying a whey composition, such as acid whey produced as a byproduct of Greek yogurt production. The process 200 can include, at 202, providing or receiving a whey feed composition, such as the acid whey 1 shown in FIG. 1. The whey feed composition can have a total solids content of less than 11 wt. % solids, at least about 2.5% DB lactic acid, less than about 70% DB lactose, and less than or equal to 10 wt. % protein. The whey feed composition can also have a galactose content of at least about 3% DB galactose. At 204, the whey feed composition is concentrated to form a concentrated whey composition, such as the concentrated acid whey 44 in FIG. 1. The whey feed composition can be concentrated to at least about 70 wt. % TS, such as to at least about 75 wt. % TS, for example at least about 85 wt. % TS, such as at least about 90 wt. % TS, to form the concentrated whey composition. In an example, concentrating the whey feed composition comprises evaporating water from the whey feed composition in a plurality of evaporators connected in series, e.g., the evaporators 34, 36, and 38, to form the concentrated whey composition. At least one of the evaporators in the series of evaporators can comprise a swept-surface evaporator. In an example, the last evaporator in the series, e.g., the third evaporator 38, comprises a swept-surface evaporator.

At 206, at least a portion of the lactose in the concentrated whey composition is crystallized, e.g., to α-lactose monohydrate, in a crystallization cascade to form an at least partially-crystallized whey composition, such as the crystallized acid whey 60 in FIG. 1. The crystallization cascade can include one or more crystallizing stages, such as the stages of the mixers 46 and 48 in FIG. 1. The crystallizing can comprise cooling the concentrated whey composition in a plurality of crystallizing stages connected in series to form the at least partially-crystallized whey composition. In an example, this cooling and crystallizing can include mixing the concentrated whey composition in one or more mixers while cooling the whey composition in the one or more mixers.

In an example, the cooling and crystallizing can include mixing the concentrated whey composition in a first mixer while cooling the concentrated whey composition to a first temperature that is lower than a feed temperature of the whey composition, e.g., with a first cooling water, to form an intermediate partially-crystallized whey composition, such as the intermediate partially-crystallized acid whey 54. The intermediate partially-crystallized whey composition can be mixed in a second mixer, e.g., the mixer 48, while cooling the intermediate partially-crystallized whey in the second mixer to a second temperature that is lower than the first temperature, e.g., with a second cooling water flowing from a cooling water inlet 56 to a cooling water outlet 58, to form the at least partially-crystalized whey composition, e.g., the crystallized acid whey 60.

At 208, a neutralizing compound, e.g., calcium hydroxide 62 in FIG. 1, can be added to the crystallization cascade to form a mixture of the at least partially-crystallized whey composition and the neutralizing compound. The neutralizing compound can be a compound that reacts with at least a portion of lactic acid in the whey composition to form a reaction product that is at least one of less hygroscopic than lactic acid and less soluble in water than lactic acid. In an example, the neutralizing compound can be added to the last stage in the series of crystallizing stages, e.g., the second mixer 48, to form the mixture of the at least partially-crystallized whey and the neutralizing compound. The mixture can include one or more reaction products of a reaction between the neutralizing compound and a component of the at least partially-crystallized whey composition, such as the reaction products of a reaction between calcium hydroxide and lactic acid.

At 210, the mixture of the at least partially-crystallized whey composition and the neutralizing compound are dried to form a dried product, such as by feeding the mixture into a dryer 70. In an example, the drying of the mixture is not via spray drying. The drying can be via a fluid bed dryer, e.g., by feeding the mixture into a fluid bed dryer and feeding drying air having a temperature higher than a temperature of the mixture into the fluid bed dryer at an air velocity sufficient to fluidize the mixture.

The process 200 can also optionally include, prior to concentrating the whey feed composition (202), at 212, pre-treating the whey feed composition, such as by pasteurizing the whey feed composition, such as in the pasteurizer 26.

The process 200 can also optionally include, at 214, recovering fine particles from the air exhausted from the dryer, such as by feeding the exhaust 78 of the fluid bed dryer 70 into a baghouse 84, a cyclone, or a scrubbing system to recover fines 82, as in the example of FIG. 1. The recovered fine particles can be recycled to an earlier part of the process 200, such as the step of crystallizing at least a portion of the lactose in the crystallization cascade.

The process 200 can also optionally include, at 216, after drying the mixture to form the dried product, finishing the dried product into a desired final form, such as a free-flowing powdered product, for example by milling the dried product 68 in the mill 84 to form the free-flowing powdered acid whey 86. Finishing can also include packaging the dried product, such as with the packaging system 88 in FIG. 1.

PROPHETIC EXAMPLE

Acid whey from a Greek yogurt production facility was obtained as a whey feed composition for a process according to the present invention. The acid whey was 6 wt. % TS, was from about 55% to about 65% DB lactose, from about 4.4% to about 5.5% DB protein, from about 8.5% to about 11% DB lactic acid, and from about 5% to about 13% DB galactose.

The acid whey was concentrated in three evaporators connected in series, with the final evaporator comprising a swept-surface evaporator, to form a concentrated acid whey. The total solids content of the acid whey coming out of the first evaporator was about 60 wt. % TS. The total solids content of the acid whey coming out of the second evaporator was about 75 wt. % TS. The total solids content of the concentrated acid whey coming out of the swept-surface evaporator was about 87 wt. % TS.

The concentrated acid whey was crystallized in a crystallization cascade comprising two mixers/coolers connected in series that are configured to crystallize at least a portion of the lactose in the concentrated acid whey to α-lactose monohydrate. Cooling water at a temperature of about 30° C. is fed to the first mixer/cooler in order to achieve a temperature of the concentrated acid whey of about 60° C. coming out of the first mixer/cooler. Ice water at a temperature of about 4° C. is fed to the second mixer/cooler in order to achieve a temperature of the concentrated acid whey of about 25° C. coming out of the second mixer/cooler.

The percentage of lactose in the crystallized acid whey coming out of the crystallization cascade that is α-lactose monohydrate, as opposed to amorphous lactose, is from about 80% to about 100% α-lactose monohydrate.

A neutralizing compound of calcium hydroxide $(Ca(OH)_2)$ is added to the second mixer/cooler to convert at least some of the lactic acid in the concentrated acid whey to a reaction product that is less hygroscopic than lactic acid, less water-soluble than lactic acid, or both. Approximately 100% of the $Ca(OH)_2$ necessary to achieve total theoretical neutralization of the lactic acid is added to the crystallization cascade.

The crystallized acid whey is broken up, for example in a chopper, in order to break up larger agglomerations of the crystallized acid whey. The broken up crystallized acid whey is dried in a fluid bed dyer having a heating stage and a cooling stage. Heated air at a temperature of about 130° C. is added to the heating stage and cooling air at a temperature of about 10° C. is added to the cooling stage. The resulting solid particles have a total solids content of about 95 wt. % TS. The solid particles output from the fluid bed dryer are milled to a desired particle size.

To better illustrate processes and systems for processing whey compositions, such as acid whey, described herein, a non-limiting list of example Embodiments is provided here:

EMBODIMENT 1 can include subject matter (such as an apparatus, a device, a method, or one or more means for performing acts), such as can include a process. The subject matter can include concentrating a whey composition to at least about 75 wt. % solids in one or more evaporators connected in series to form a concentrated whey composition, wherein at least one of the evaporators comprises an evaporator configured to agitate the whey composition within the at least one evaporator, crystallizing at least a portion of the lactose in the concentrated whey composition in a crystallization cascade comprising one or more crystallizing stages to form an at least partially-crystallized whey composition, and drying the at least partially-crystallized whey composition to form a dried whey product.

EMBODIMENT 2 can include, or can optionally be combined with the subject matter of EMBODIMENT 1, to optionally include a last evaporator of the series of one or more evaporators comprises the at least one evaporator configured to agitate the whey composition.

EMBODIMENT 3 can include, or can optionally be combined with the subject matter of any one or any combination of EMBODIMENTS 1 or 2, to optionally include the at least one evaporator configured to agitate the whey composition comprises a swept-surface evaporator.

EMBODIMENT 4 can include, or can optionally be combined with the subject matter of any one or any combination of EMBODIMENTS 1-3, to optionally include the drying comprising feeding the at least partially-crystallized whey composition into a fluid bed dryer and feeding air having a temperature higher than a feed temperature of the at least partially-crystallized whey composition into the fluid bed dryer at an air velocity sufficient to fluidize the mixture.

EMBODIMENT 5 can include, or can optionally be combined with the subject matter of any one or any combination of EMBODIMENTS 1-4, to optionally include the drying not comprising spray drying.

EMBODIMENT 6 can include, or can optionally be combined with the subject matter of any one or any combination of EMBODIMENTS 1-5, to optionally include the crystallizing comprising crystallizing at least the portion of the lactose in the whey composition in a crystallization cascade comprising one or more crystallizing stages to form the at least partially-crystallized whey composition.

EMBODIMENT 7 can include, or can optionally be combined with the subject matter of any one or any combination of EMBODIMENTS 1-6, to optionally include the process further comprising adding a neutralizing compound to the process, wherein the neutralizing compound is a compound that reacts with at least a portion of the lactic acid in the whey composition to form a reaction product that is at least one of less hygroscopic than lactic acid and less soluble in water than lactic acid, to form a mixture of the at least-partially crystallized whey composition and at least one of the neutralizing compound and a reaction product of the neutralizing compounds and lactic acid.

EMBODIMENT 8 can include, or can optionally be combined with the subject matter of any one or any combination of EMBODIMENTS 1-7, to optionally include forming a mixture of the at least partially-crystallized whey composition and a neutralizing compound prior to drying the at least partially-crystallized whey composition, wherein the neutralizing compound is a compound that reacts with at least a portion of lactic acid in the whey composition to form a reaction product that is at least one of less hygroscopic than lactic acid and less soluble in water than lactic acid.

EMBODIMENT 9 can include, or can optionally be combined with the subject matter of any one or any combination of EMBODIMENTS 1-8, to optionally include the adding of the neutralizing compound comprising adding the neutralizing compound to a last stage of the one or more crystallizing stages of the crystallization cascade.

EMBODIMENT 10 can include, or can optionally be combined with the subject matter of any one or any combination of EMBODIMENTS 1-9, to optionally include the neutralizing compound comprising at least one of a multivalent hydroxide salt and a multivalent carbonate salt.

EMBODIMENT 11 can include, or can optionally be combined with the subject matter of any one or any combination of EMBODIMENTS 1-10, to optionally include the neutralizing compound comprising one or more salts capable of reacting with the lactic acid, the one or more salts comprising a cation of one of the following elements or groups: Ag, Al, Ba, Bi, Ca, Co, Cu, Fe, K, Mn, Na, $NH_4$, Pb, St, or Zn.

EMBODIMENT 12 can include, or can optionally be combined with the subject matter of any one or any combination of EMBODIMENTS 1-11, to optionally include the neutralizing compound comprising at least one of calcium hydroxide (Ca(OH)2), calcium carbonate (CaCO3), magnesium hydroxide (Mg(OH)2), and magnesium carbonate (MgCO3).

EMBODIMENT 13 can include, or can optionally be combined with the subject matter of any one or any combination of EMBODIMENTS 1-12, to optionally include the crystallizing comprising mixing the whey composition in one or more mixers while cooling the whey composition in each of the one or more mixers to form the at least partially-crystallized whey composition.

EMBODIMENT 14 can include, or can optionally be combined with the subject matter of any one or any combination of EMBODIMENTS 1-13, to optionally include the whey composition comprising less than about 70 wt. % lactose on a dry basis.

EMBODIMENT 15 can include, or can optionally be combined with the subject matter of any one or any combination of EMBODIMENTS 1-14, to optionally include the whey composition comprising at least about 3 wt. % lactic acid on a dry basis.

EMBODIMENT 16 can include, or can optionally be combined with the subject matter of any one or any combination of EMBODIMENTS 1-15, to optionally include the whey composition being less than or equal to about 10 wt. % protein on a dry basis.

EMBODIMENT 17 can include, or can optionally be combined with the subject matter of any one or any combination of EMBODIMENTS 1-16, to optionally include the whey composition being greater than about 3 wt. % galactose on a dry basis.

EMBODIMENT 18 can include, or can optionally be combined with the subject matter of one or any combination of EMBODIMENTS 1-17, to include subject matter (such as an apparatus, a device, a method, or one or more means for performing acts), such as can include a process. The subject matter can include providing or receiving a whey feed composition comprising less than about 70 wt. % lactose on a dry basis and at least about 2.5 wt. % lactic acid on a dry basis, concentrating the whey feed composition to at least about 85 wt. % total solids in a plurality of evaporators connected in series to form a concentrated whey composition, wherein a last evaporator in the series of evaporators comprises a swept-surface evaporator, cooling the concentrated whey composition in a crystallization cascade to crystallize at least a portion of the lactose in the concentrated whey composition, the crystallization cascade comprising a plurality of crystallizing stages connected in series to form an at least partially-crystallized whey composition, adding a neutralizing compound to the last stage in the series of crystallizing stages to form a mixture of the at least partially-crystallized whey and the neutralizing compound, wherein the neutralizing compound is a compound that reacts with at least a portion of lactic acid in the whey composition to form a reaction product that is at least one of less hygroscopic than lactic acid and less soluble in water than lactic acid, and drying the mixture to form a dried whey product.

EMBODIMENT 19 can include, or can optionally be combined with the subject matter of any one or any combination of EMBODIMENTS 1-18, to optionally include the crystallization cascade comprising mixing the concentrated whey composition in a first mixer while cooling the whey composition in the first mixer to a first temperature that is lower than a feed temperature of the whey composition to form an intermediate partially-crystallized whey composition.

EMBODIMENT 20 can include, or can optionally be combined with the subject matter of any one or any combination of EMBODIMENTS 1-19, to optionally include mixing the intermediate partially-crystallized whey composition in a second mixer while cooling the intermediate partially-crystallized whey in the second mixer to a second temperature that is lower than the first temperature to form the at least partially-crystalized whey composition.

EMBODIMENT 21 can include, or can optionally be combined with the subject matter of any one or any combination of EMBODIMENTS 1-20, to optionally include the neutralizing compound being added to the second mixer to form the mixture.

EMBODIMENT 22 can include, or can optionally be combined with the subject matter of one or any combination of EMBODIMENTS 1-21, to include subject matter (such as an apparatus, a device, a method, or one or more means for performing acts), such as can include a system for processing a whey composition. The subject matter can include a supply system for supplying a whey composition, one or more evaporators connected in series, wherein at least one of the evaporators comprises an evaporator configured to agitate the whey composition within the at least one evaporator, the one or more evaporators configured to concentrate the whey composition to at least about 75 wt. % solids to form a concentrated whey composition, a crystallization cascade including one or more crystallizing stages configured to crystallize at least a portion of the lactose in the concentrated whey composition to form an at least partially-crystallized whey composition, and a dryer configured to dry the mixture to form a dried product.

EMBODIMENT 23 can include, or can optionally be combined with the subject matter of any one or any combination of EMBODIMENTS 1-22, to optionally include the whey composition being less than about 70 wt. % lactose on a dry basis.

EMBODIMENT 24 can include, or can optionally be combined with the subject matter of any one or any combination of EMBODIMENTS 1-23, to optionally include the whey composition being at least about 2.5 wt. % lactic acid on a dry basis.

EMBODIMENT 25 can include, or can optionally be combined with the subject matter of any one or any combination of EMBODIMENTS 1-24, to optionally include the whey composition being less than or equal to about 10 wt. % protein on a dry basis.

EMBODIMENT 26 can include, or can optionally be combined with the subject matter of any one or any combination of EMBODIMENTS 1-25, to optionally include the whey composition being at least about 3 wt. % galactose on a dry basis.

EMBODIMENT 27 can include, or can optionally be combined with the subject matter of any one or any combination of EMBODIMENTS 1-26, to optionally include a last one of the series of the one or more evaporators comprising the at least one evaporator configured to agitate the whey composition.

EMBODIMENT 28 can include, or can optionally be combined with the subject matter of any one or any combination of EMBODIMENTS 1-27, to optionally include the dryer comprising a fluid bed dryer.

EMBODIMENT 29 can include, or can optionally be combined with the subject matter of any one or any combination of EMBODIMENTS 1-28, to optionally include a feed line configured to add a neutralizing compound to the whey composition to form a mixture of whey composition and the neutralizing compound, wherein the neutralizing compound is a compound that reacts with at least a portion of lactic acid in the whey composition to form a reaction product that is at least one of less hygroscopic than lactic acid and less soluble in water than lactic acid.

EMBODIMENT 30 can include, or can optionally be combined with the subject matter of any one or any combination of EMBODIMENTS 1-29, to optionally include the feed line being configured to add the neutralizing compound to the crystallization cascade to form a mixture of the at least partially-crystallized whey composition and the neutralizing compound.

EMBODIMENT 31 can include, or can optionally be combined with the subject matter of any one or any combination of EMBODIMENTS 1-30, to optionally include the neutralizing compound comprising one or more salts capable of reacting with lactic acid, the one or more salts comprising a cation of one of the following elements or groups: Ag, Al, Ba, Bi, Ca, Co, Cu, Fe, K, Mn, Na, $NH_4$, Pb, St, or Zn.

EMBODIMENT 32 can include, or can optionally be combined with the subject matter of any one or any combination of EMBODIMENTS 1-31, to optionally include the neutralizing compound comprising at least one of a multivalent hydroxide salt and a multivalent carbonate salt.

EMBODIMENT 33 can include, or can optionally be combined with the subject matter of any one or any combination of EMBODIMENTS 1-32, to optionally include the neutralizing compound comprising at least one of calcium hydroxide (Ca(OH)2), calcium carbonate (CaCO3), magnesium hydroxide ($Mg(OH)_2$), and magnesium carbonate ($MgCO_3$).

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A system comprising:
   a supply system for supplying a first whey composition comprising lactose;
   a concentration system comprising two or more evaporators connected in series, wherein at least one of the evaporators comprises an evaporator configured to agitate the whey composition within the at least one evaporator, the two or more evaporators configured to concentrate the whey composition to form a concentrated whey composition comprising at least about 75 weight % solids;
   a crystallization system configured to receive the concentrated whey composition from the concentration system, the crystallization system comprising a crystallization cascade comprising one or more crystallizing stages configured to crystallize at least a portion of the lactose in the concentrated whey composition to form an at least partially-crystallized whey composition, wherein the crystallization system is separate from the concentration system; and
   a dryer configured to dry the at least partially-crystallized whey composition to form a dried product, wherein the dryer is separate from the concentration system and the crystallization system.

2. The system of claim 1, wherein the first whey composition comprises less than about 70 weight % lactose on a dry basis.

3. The system of claim 1, wherein the first whey composition comprises greater than or equal to about 2.5 weight % lactic acid on a dry basis.

4. The system of claim 1, wherein the first whey composition comprises less than or equal to about 10 weight % protein on a dry basis.

5. The system of claim 1, wherein the first whey composition comprises greater than about 3 weight % galactose on a dry basis.

6. The system of claim 1, wherein a last one of the series of the two or more evaporators comprises the at least one evaporator configured to agitate the whey composition.

7. The system of claim 1, wherein the dryer comprises a fluid bed dryer.

8. The system of claim 1, further comprising a feed system configured to add a neutralizing compound to at least one of the first whey composition, the concentrated whey composition, or the partially-crystallized whey composition prior to the dryer wherein the neutralizing compound is capable of reacting with lactic acid to form a reaction product that is at least one of less hygroscopic than lactic acid and less soluble in water than lactic acid.

9. The system of claim 8, wherein the neutralizing compound comprises at least one of a multivalent hydroxide salt or a multivalent carbonate salt.

10. The system of claim 8, wherein the neutralizing compound comprises at least one of calcium hydroxide ($Ca(OH)_2$), calcium carbonate ($CaCO_3$), magnesium hydroxide ($Mg(OH)_2$), or magnesium carbonate ($MgCO_3$).

\* \* \* \* \*